United States Patent [19]
Kim et al.

[11] Patent Number: 5,649,107
[45] Date of Patent: Jul. 15, 1997

[54] TRAFFIC STATISTICS PROCESSING APPARATUS USING MEMORY TO INCREASE SPEED AND CAPACITY BY STORING PARTIALLY MANIPULATED DATA

[75] Inventors: Myeong Suk Kim; Suk Chun Song; Tae Woon Kang; Mun Kee Choi, all of Daejeon, Rep. of Korea

[73] Assignees: Electronics and Telecommunications Research Institute, Daejeon; Korea Telecommunications Authority, Seoul, both of Rep. of Korea

[21] Appl. No.: 346,079

[22] Filed: Nov. 29, 1994

[30] Foreign Application Priority Data

Nov. 29, 1993 [KR] Rep. of Korea ............... 1993-25731

[51] Int. Cl.$^6$ .................... G06F 13/38; H04L 12/56
[52] U.S. Cl. ............. 395/200.11; 370/232; 370/235; 395/800; 395/200.13; 364/DIG. 1; 364/DIG. 2
[58] Field of Search .................. 395/800, 184.01, 395/200.1, 731, 610, 200.03, 200.06, 200.13, 200.15, 684, 200.12, 200.11, 182.02; 364/DIG. 1, DIG. 2; 370/60.1, 94.1, 94.2, 60, 232, 235, 233, 253, 234, 395, 528; 340/825.57, 825.65, 825.5

[56] References Cited

U.S. PATENT DOCUMENTS

| | | | |
|---|---|---|---|
| 5,321,692 | 6/1994 | Wallmeier | 370/60 |
| 5,327,421 | 7/1994 | Hiller et al. | 370/60.1 |
| 5,339,310 | 8/1994 | Taniguchi | 370/60 |
| 5,465,348 | 11/1995 | Amemiya et al. | 395/182.02 |
| 5,519,689 | 5/1996 | Kim | 370/17 |

*Primary Examiner*—Daniel H. Pan
*Attorney, Agent, or Firm*—Merchant, Gould, Smith, Edell, Welter & Schmidt, P.A.

[57] ABSTRACT

To provide a high speed traffic statictics processing apparatus using memory so that a statistical processing for an enormous amount of measured data can be executed in real time by manipulating partially the measured data and storing the partially manipulated measured data using memory and a simple circuit, not transferring the enormous amount of measured data directly to a statistical processor, the present invention comprises a measurement traffic extractor for discriminating the measured traffics from other traffics and extracting the measured traffics, a traffic manipulator for manipulating the extracted traffics, a traffic statistical processor for executing the statistical processing of the manipulated traffic, a traffic dispaly for displaying the data which traffics are processed for and an application processor for requesting for the traffic measurement and controlling their overall operation.

2 Claims, 6 Drawing Sheets

TRAFFIC STATISTICS PROCESSING APPARATUS USING MEMORY TO INCREASE SPEED AND CAPACITY BY STORING PARTIALLY MANIPULATED DATA

BACKGROUND OF THE INVENTION

Field of the Invention

The present invention relates to a high speed traffic statistics processing apparatus using memory which executes statistical processing for an enormous amount of measured data in real time.

In a convention high speed packet network where information is transferred in a form of packets, traffics for the transferred packets generally need to be measured and monitored. Especially in an ATM(Asynchronous Transfer Mode) network, information is transferred in the form of a certain length of data packet which is called an ATM cell. The header information of the cell includes address information. Required are various kinds of statistical information on traffics for the cells with specific addresses, which need to be measured and monitored. The traffic speed in a high speed data transfer network like an ATM network reaches up to Mega to Giga levels, where the information amount would be an enormous amount of traffics exceeding tens of thousands to millions of traffics per second. It would definitely be tremendous work to execute statistical processing for those traffics, during which the characteristics of traffics should be obtained in such a way that sequential arrangement for such a high speed traffic must be made and then the average of the traffic found. Furthermore, its real time processing would be almost impossible.

SUMMARY OF THE INVENTION

It is an object of the present invention to provide a high speed traffic statictics processing apparatus using memory so that statistical processing for an enormous amount of measured data can be executed in real time by partially manipulating the measured data and storing the partially manipulated measured data using memory and a simple circuit, not transferring the enormous amount of measured data directly to a statistical processing unit, for example, a processor.

To achieve the object of the present invention, the high speed traffic statistics processing apparatus using memory comprises a measurement traffic extracting means which generates a cell arrival signal if the address information of measured data is the same as the cell header information received, after comparison of the two informations, and outputs decoder information using a decoder when there are several measured traffics; a traffic manipulating means which maps time information and number information of traffics into the address of memory and the data information of the memory by mapping the time information between cell arrivals of said measured traffic extracting means into the information address of the memory and increasing the data information within appropriate addresses; a traffic statistical processing means which periodically reads out the information manipulated at said traffic manipulating means and obtains various kinds of statistical data; a traffic display means which executes the function of graphic user interface (GUI) by displaying various kinds of characteristic data on traffics obtained from said traffic statistical processing means through a monitor using graphics interfaced with users; and an application processing means which executes the function of overall control by accepting from outside and sending to appropriate functional means respectively the general information of the measured traffic such as the VPI/VCI information or speed information of a traffic.

BRIEF DESCRIPTION OF THE DRAWINGS

The above and other objects, features and advantages of the present invention will be more clearly understood from the following detailed description taken in conjunction with the accompanying drawings, in which:

FIG. 1 shows a traffic monitor connected to the interface between two systems to be measured in a high speed telecommunication network, which the present invention will be applied to;

DETAILED DESCRIPTION OF THE PREFERRED EMBODIMENT

An embodiment of the present invention will be described in detail hereinbelow.

Figure 1:
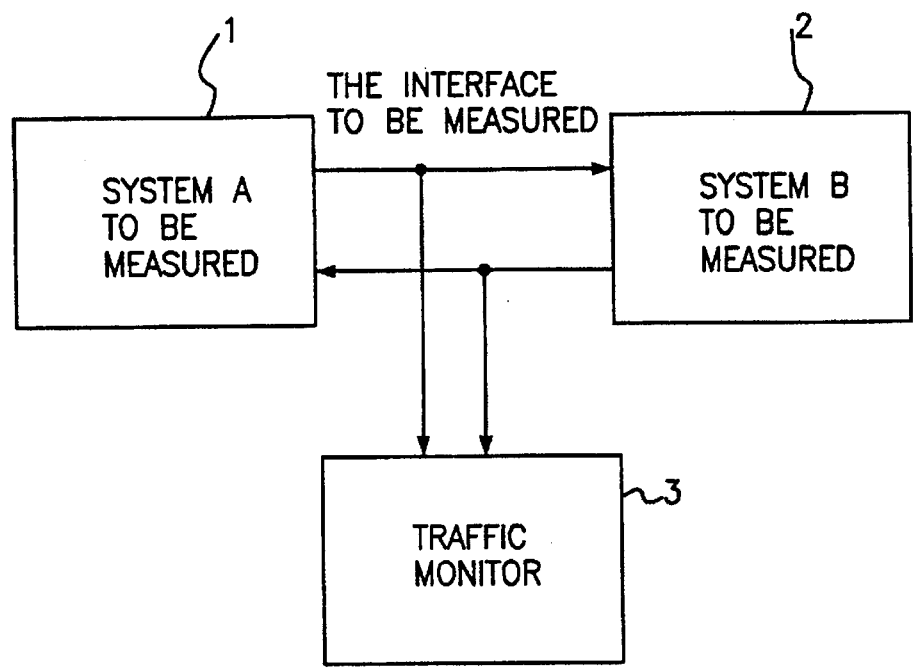
Figure 2:
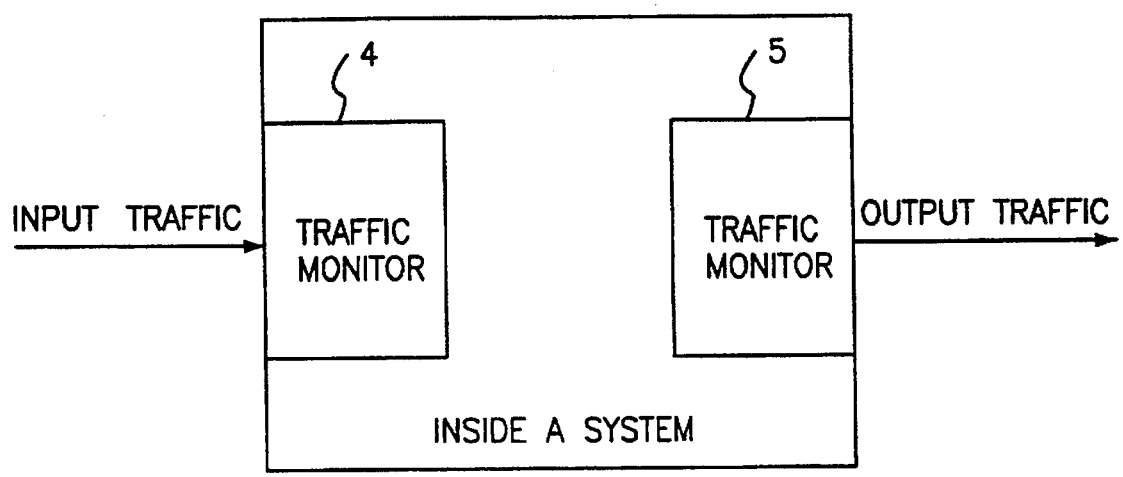
FIG. 2 shows traffic monitors installed inside a system with input traffics and output traffics for measurements.

Reffering to FIG. 1 and FIG. 2, there are shown respectively a traffic monitor connected to the interface between two systems to be measured in a high speed telecommunication network to which the present invention will be applied and the traffic monitors installed inside a system with input traffics and output traffics for measurements. The numbers 1 and 2 represent systems to be measured and the numbers 3, 4 and 5 represent traffic monitors respectively.

The measurement method proposed by the present invention will be applied to external interfaces to be measured, such as BISDN user network interface(UNI), network network interface(NNI) and high speed LAN, and inside a system, for example, at line terminals(LT) and gateways. In the former case, which is the same case as shown in FIG. 1, a traffic moniter 3 is connected on the interface path between the two systems 1 and 2 to be measured so that traffics at each interface, being transferred from a terminal to a network or from a network to a terminal can be extracted and monitored by utilizing its function of recognition of packet arrivals, having between the interfaces to be measured the substructure which has the same structure as its physical hierarchy, while in the latter case the function of obtaining statistical information on the traffics to be inputted and outputted can be realized by placing traffic monitors 4 and 5 at the input and output of the system.

Figure 3:
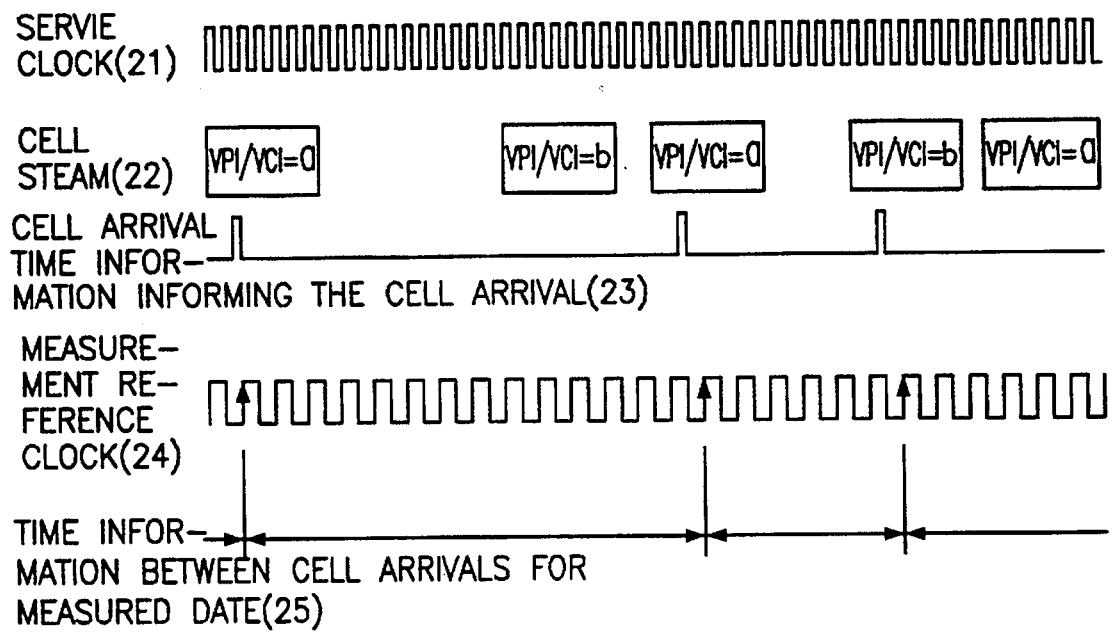
FIG. 3 shows a timing diagram of the signals to be used during the transfer of the signals from a physical hierarchy to an ATM hierarchy and time information of the measured traffic.

Reffering to FIG. 3, there are shown the signals to be used during the transfer of the signals from a physical hierarchy to an ATM hierarchy and a process for extracting time information of the measured traffic from traffic streams.

ATM cell information discriminated from the physical hierarchy uses the following signals at the ATM hierarchy.

Figure 4:
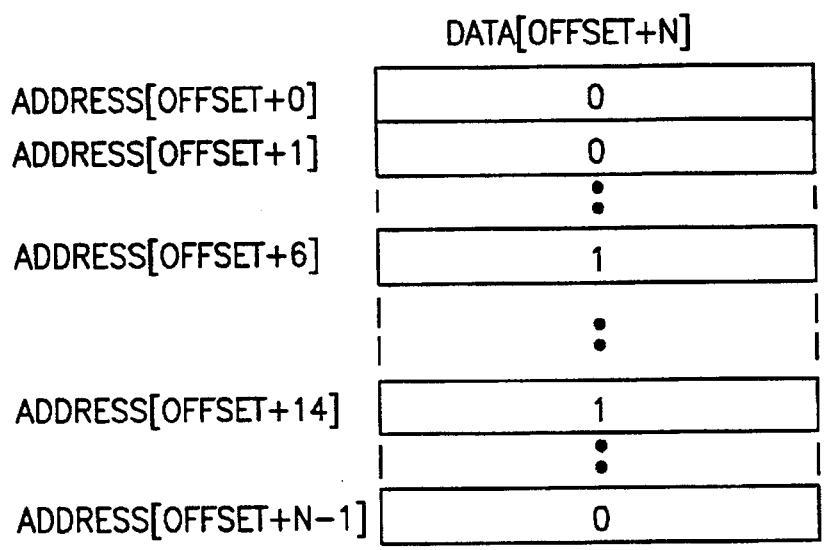
FIG. 4 shows addresses and data allocated in a memory used in the present invention.

In other words, the service clock 21, which is induced from the clock of a network, is used as a transfer clock to transfer cells from the physical hierarchy to the ATM hierarchy and also used for the transfer of information at the speed demultiplied by integer times of octet in parallel processing. Assumed is a cell stream 22 with a mixture of a cell. VPI/VCI=a, which has the address of the measured cell and a cell, VPI/VCI=b, which is not the measured cell. Count information counting the number of arrivals during the measurement period can be obtained by utilizing the signal 23 informing of the arrival of a measured cell which is the signal with a state of 'high' during a service clock when the measurement address has been identified after the arrival of a cell. When a cell extracted by the measurement traffic extractor, VPI/VCI=a, is identified the cell stream 22 latches this value to a time stamp by the cell arrival time information 23 and obtains time information between cell arrivals by the count value increased during that time. The cell arrival signal 23 is used as information between cell arrivals and also used as a time stamp latch signal for the measurement of traffics. A measurement reference clock 24, which is used for time stamp, is a clock induced from a reference clock and is used to determine the resolving power for the traffic speed of the measurement traffic by resolving power parameters. For example, in the case of a 1 MHz reference clock, the time during a clock will be 1 µs. Its real resolution at the resolving parameter of 10 will be 10 µs on the basis of a clock divides and be used as a measurement clock. Namely, the range of an address is related to the characteristics of a traffic and the time interval between the address and a neighboring address is also related to the resolving power. In short, assuming that the resolving power of a reference clock is 10 µs and a 10 bit address is used, 1024 pieces of information, that is, a traffic which can have cell arrival information from 10 µs to 10 ms, can be measured in an accuracy of a unit of 10 µs. Utilizing the clock induced as decribed above, the traffic of a cell stream 23, VPI/VCI=a, will be 140 µs as the information between cell arrivals for the first and second arrivals and 60 µs as the second information. A table as shown in FIG. 4 can be made according to the information to be collected in this way every time measurement cells arrive. Now several traffic parameters can be obtained here. The average speed of cells will be $$(6+14)/2 = 10 * 10 \mu s$$

and the maximum time between cell arrivals will be 140 µs. In the meantime the information on the cells exceeding an allowable range will be stored in a most significant address. In reality, the allowable range is related to jitter characteristics of a cell and can be adjusted by resolving power parameters even though it uses the same size of memory.

The present invention realizes a high speed traffic statistics processing apparatus using memory by designing it in such a way that the table structure can be converted into memory as shown in FIG. 4.

Namely the time information between cell arrivals can be mapped into address information of the memory and the number of the cells which arrived in relevant time can be also mapped into the contents of the table and data in the memory at the same time.

Figure 5A:
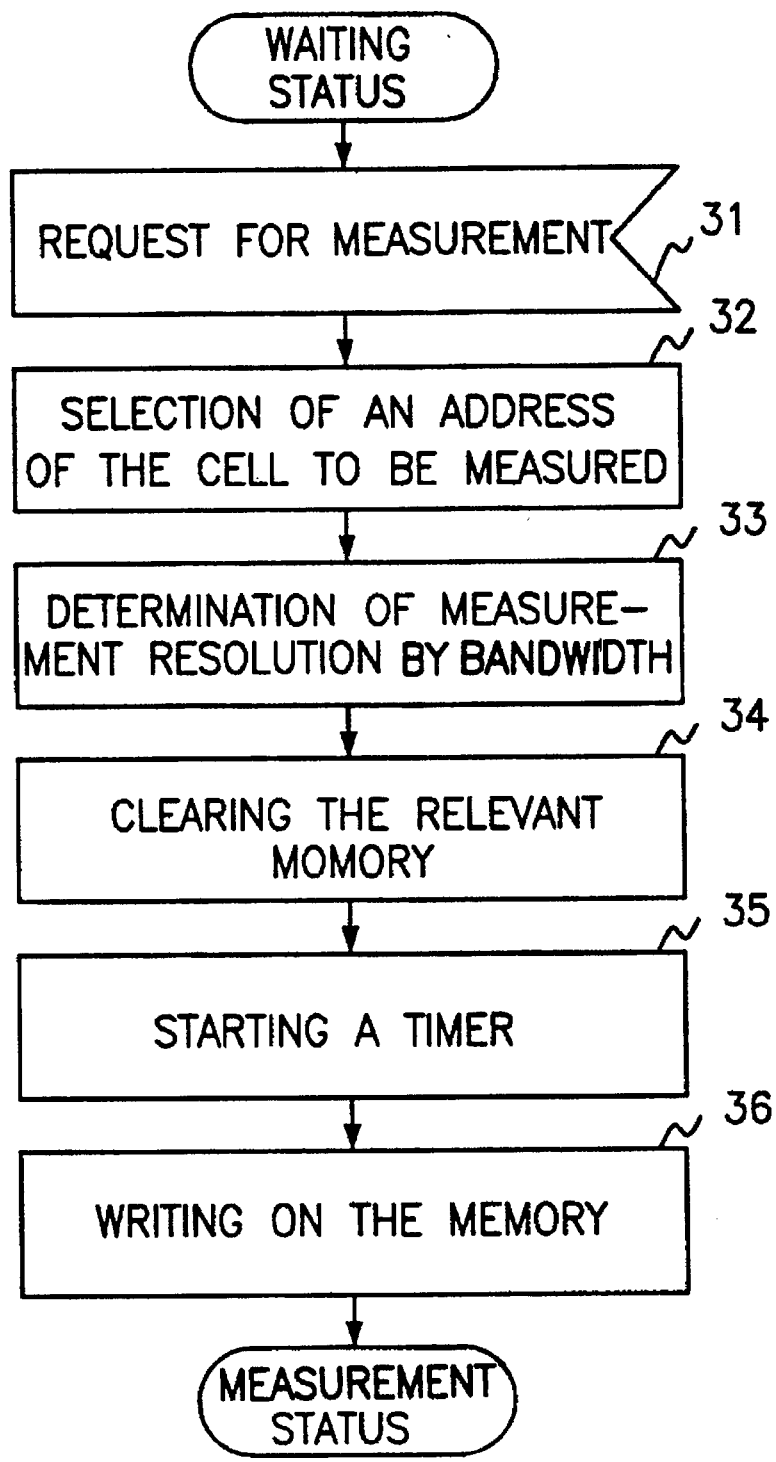
FIGS. 5A and 5B are flow charts of monitoring cell processing at a traffic processing unit of the present invention.
Figure 5B:
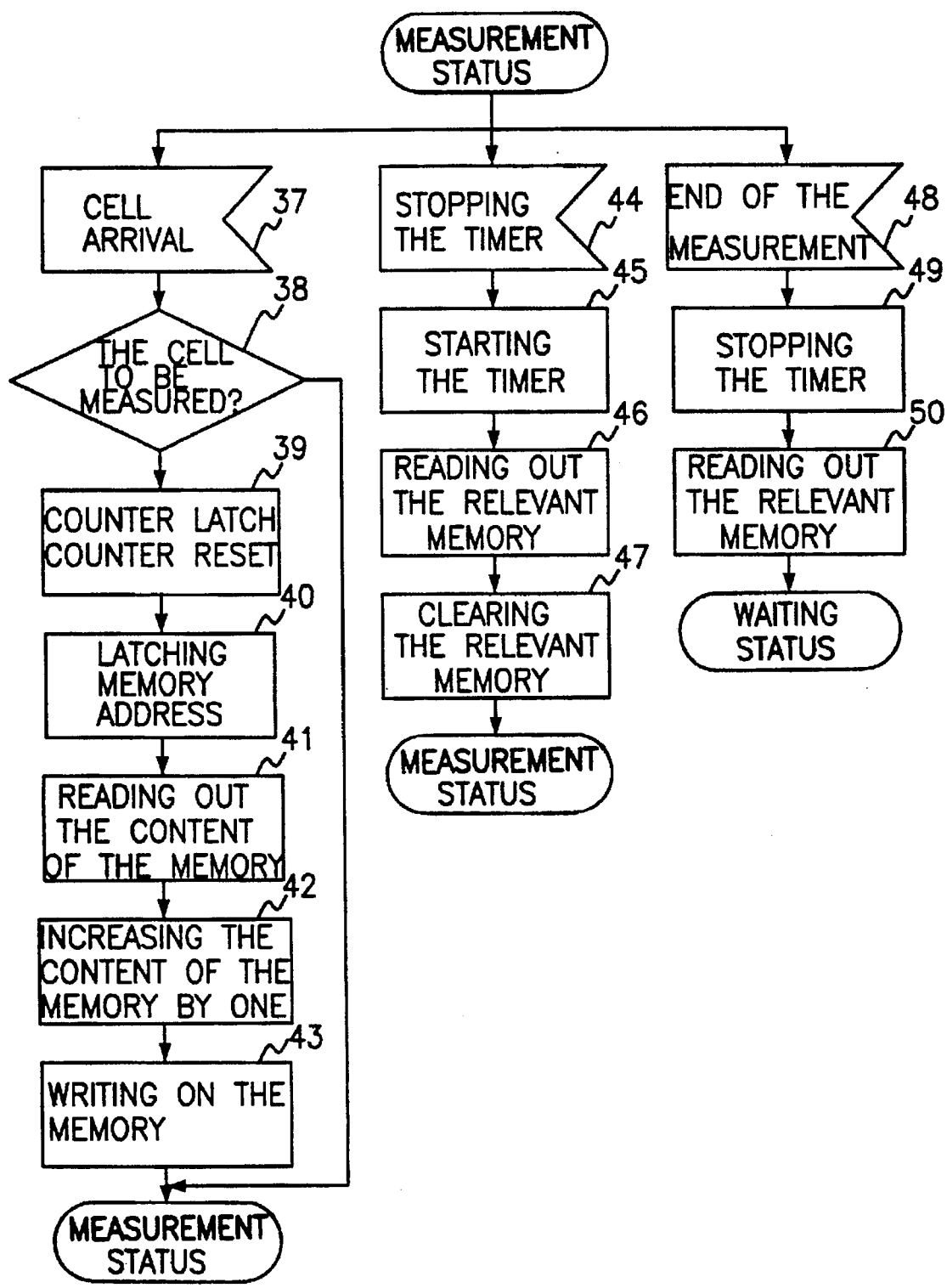

Referring to FIG. 5(A) and FIG. 5(B), there are shown in detail a monitoring flow chart for cell processing at a traffic manipulator, which maps time information and number information of a traffic into addresses of memory and data information of memory. The traffic manipulator can be divided into a status of waiting, where it waits for an order of measurement by a processor FIG. 5(A), and a status of measurement, where measurements can be taken according to a request of measurements.

To operate the traffic manipulator at a waiting status, first, at the time of request of a measurement 31, the determination of an address of a traffic to be measured must be made 32 and a proper resolution for the information must be also determined from the bandwidth information of a relevant traffic 33. This resolution information has correlation with the accuracy of traffic information and the amount of information.

The content of the information can be written just after clearing the memory and starting up the timer 34, 35 and 36.

When a cell arrives from the ATM hierarchy 37, the address information of the cell will be read out and it will be checked whether it is the cell to be measured 38. If it is the cell to be measured the value of the time stamp designed by a counter will be read out its counting will be started again and the counter will be increased until the next cell to be measured arrives. In this way the value of the time stamp will have the time information between the cell arrivals for the same cell to be measured 39.

To store the time information between cell arrivals obtained as described above, the value of the time stamp will be latched into the address of memory where it will be stored and the value of data which has been stored in an appropriate address and accumulated and added up to the present time 40 and 41. This value will be increased by one for the addition and accumulation for the cell which arrived newly 42. And the new information will be stored by executing an operation of writing the increased value at the same address 43.

Real time traffic information can be obtained by starting a timer at every period for the information newly updated at every cell arrival and reading out the memory area sequentially. It will be able to be ready for obtaining the next information by writing zero "0+ onto the memory after reading out the memory. At this time the timer will be started for reading the next information. As soon as an order stopping the timer is received, the value stored at the relevant memory will be read out and the relevant memory be cleared 45, 46 and 47.

When an order stopping the measurement is received, the timer will be stopped and the relevant memory will be read out 48, 49 and 50.

Figure 6:
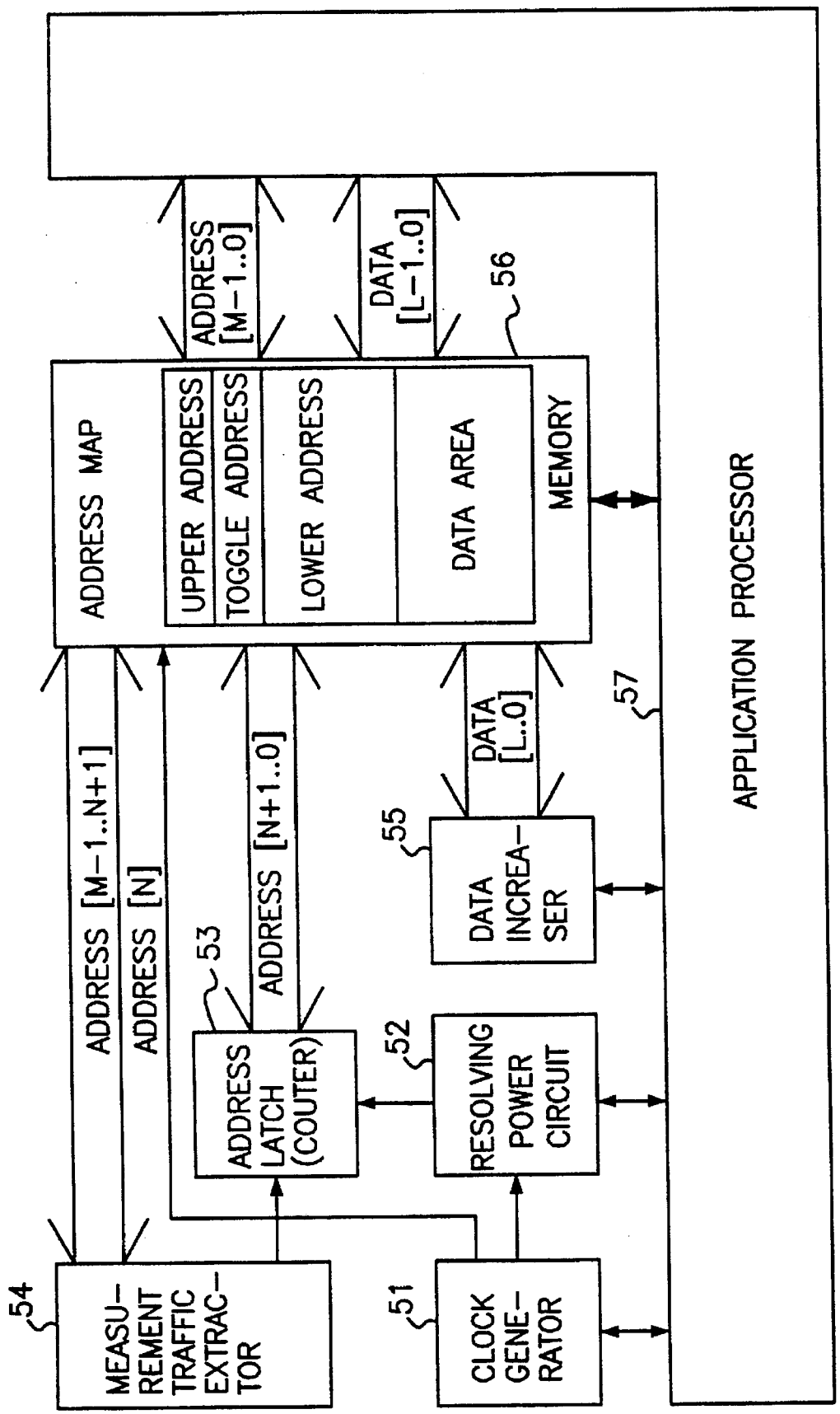
FIG. 6 is a block diagram of the traffic processing unit of the present invention.

Referring to FIG. 6, there is shown a block diagram in which the cell processing flow charts explained in FIG. 5(A) and FIG. 5(B) are realized in a circuit.

A clock generator 51 is a circuit which generates the clock which can be the minimum unit of measurement time. The clock generator generates a clock of 1 MHz at the measurement unit of 1 us. The clock generator can use the original form or demultiplied form of clocks at the minimum unit of the resolving power of or the speed of measurement data obtained from the speed information of the measured cell.

A circuit for resolving power 52 demultiplies the resolving parameters based on the traffic speed information inputted by an application processor 57, which is a controller, by utilizing a reference clock which is generated from the clock generator 51, so that proper resolving power can be obtained.

An address latch 53 which consists of counters must latch the lower address of memory Additionally, since there exist two subjects which access a memory simutaneously, there should be a doubled address area in the memory in such a way that the same memory area should not be accessed at the same time and the same size of memory should have different offsets. The address map for the memory is constructed to have a toggle address bit between the upper address and lower address allocated in the memory so that no interference can occur in the doubled memory 56 during its toggling operation.

As soon as the address of memory has been latched, the counter 52 which is an address latch must be reset so that the counter can resume its counting operation, a data increaser 55 reads out the content of the relevant memory latched, increases its content by one and executes a writing operation this time. This operation causes the application processor 57, which is a controller generating a control signal for them, to generate control signals and makes relevant signals (/CE,/ WE,/OE) to enable the read-and-write operation of memory by a control circuit. The information stored in the memory in this manner informs the traffic statistical processor, i.e. a processor, that the statistical processor must read out the information, by utilizing a timer at the unit of 1 second or 100 ms at a clock generator 51. The statistical processor erases the content of the memory, making it zero, after reading out the information in the memory Also, DPRAM(Dual Port RAM) with dual port will be suitable as the structure of memory to be used here so that both the traffic manipulator and the traffic statistical processor can access the same memory simultaneously. The signals generated at the traffic manipulator enables the processor to execute statistical processing for traffics to obtain the jitter characteristics of the cell, average cell speed and maximum cell speed from the newly manipulated information.

Figure 7:
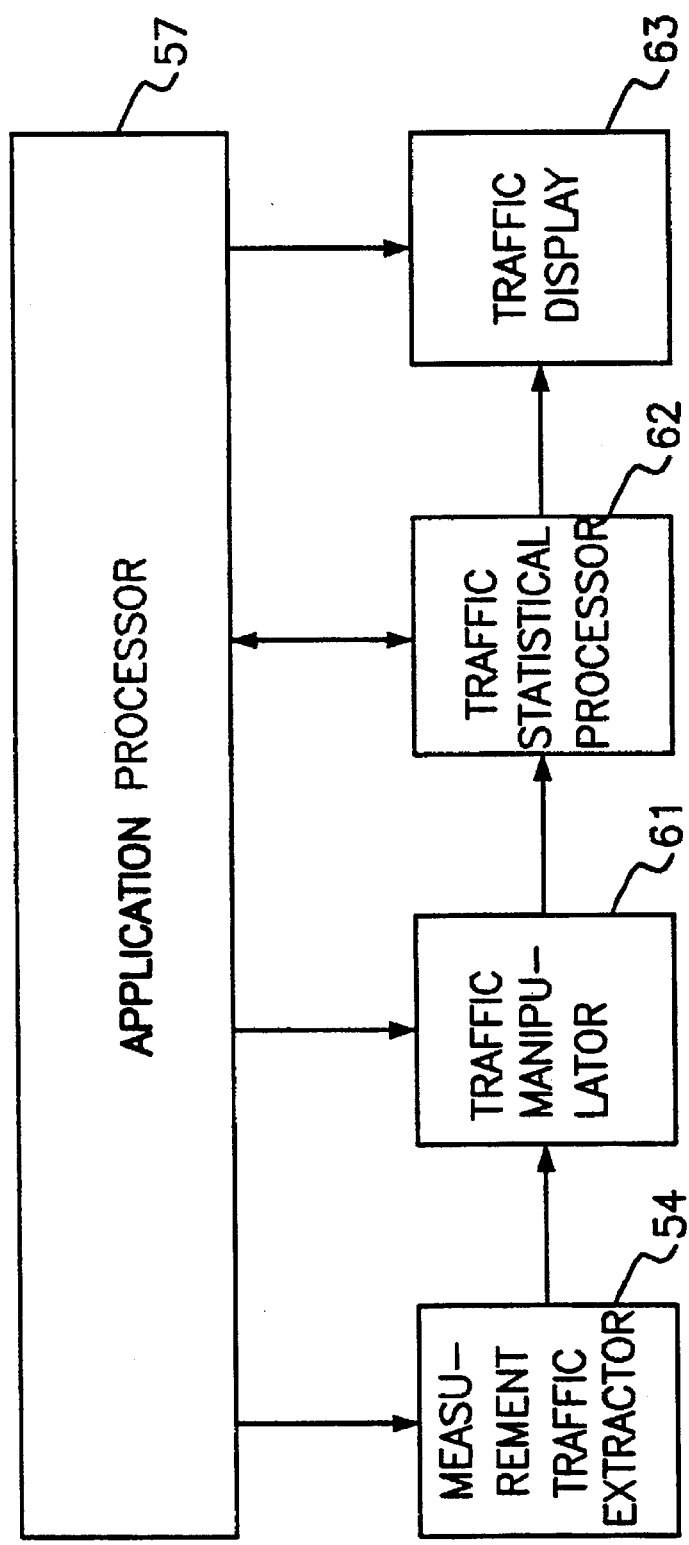
FIG. 7 is a block diagram of a traffic statistics processing apparatus of the present invention.

Referring to FIG. 7, there is shown a block diagram of a traffic statistics processing apparatus of the present invention.

The present invention comprises 5 functional units such as a measurement traffic extractor 54 for extracting the traffic to be measured by discriminating it from other traffics, a traffic manipulator 61 for manipulating the extracted traffic, a traffic statistical processor 62 for processing the manipulated traffic statistically, a display 63 for displaying the data processed by the traffic statistical processor, and an application processor for controlling the request of traffic measurement and general operation of these functional units.

The measurement traffic extractor 54 compares the cell header information received from the application processor 57 to the address information of measured data, generates the cell arrival signal shown in FIG. 3 if the information of cell header is the same as the address information of the data to be measured, and outputs the information of a decoder when it encounters several measured traffics. At this time, the decoder informations can store several measurement information seperately in a memory by utilizing the offset information.

The traffic manipulator 61 executes the function of mapping the time information and number information of traffics into the information address and the data information of a memory by mapping the time information between cell arrivals into the information address of the memory, and also executes the function of storing data for the time information between cell arrivals by determining an upper memory address, utilizing the decoder information of the traffic to be measured from said measurement traffic extractor 54 as described in detail in FIG. 6, by reading out the content of data in the appropriate memory address using the information of arrival time between cell latched from a time information generator as the lower memory address information and increasing the read-out value by one.

At traffic statistical processor 62 various statistical data can be easily obtained by periodically reading out the information manipulated in traffic manipulator 61.

A traffic display 63 executes the function of graphic user interface (GUI) by displaying various characteristic data on traffic through a monitor using graphics, interfaced with its users.

An application processor 57, a controller can be realized in the application of a high speed traffic processing monitor by executing the function of controlling each functional unit described above in detail as a whole, and also executing the function of accepting from outside and sending to each functional unit 54, 61, 62 and 63 the general information of the measured traffic such as the VPI/VCI information or speed information of a traffic.

Therefore, the present invention, as apparent from the above construction and description, provides the following advantages.

First, real time statistical processing of traffics for the measurement of individual and average jitter of cells, average and maximum cell speed can be executed by writing and storing the manipulated traffic information in a memory using a simple circuit and processing the information periodically at the traffic processor.

Second, the present invention can be applied in the external interface for measurement, at system input/output terminals or inside a system.

Third, the present invention can be easily converted and utilized in traffic measuring systems and traffic characteristics displays.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high speed traffic statistics processing apparatus using memory, comprising:

a measured traffic extracting means which generates a cell arrival signal if an address information of measured data is the same as a cell header information received, after comparison of the two informations and outputs decoder information using a decoder when there are several measured traffics;

a traffic manipulating means which maps time information and number information of traffics into the address of memory and the measured data information of the memory by mapping the time information between cell arrivals of said measured traffic extracting means into the information address of the memory and increasing data information within the address;

a traffic statistical processing means which periodically reads out information manipulated at said traffic manipulating means and obtains various kinds of statistical data;

a traffic display means which executes a function of graphic user interface (GUI) by displaying various kinds of characteristic data on traffics obtained from said traffic statistical processing means through a monitor using graphics interfaced with users; and an application processing means which executes a function of overall control by accepting from outside and sending to each appropriate functional means respectively general information of the measured traffics such as VPI/VCI information or speed information of a traffic.

2. A high speed traffic statistics processing apparatus using memory according to claim 1, wherein said traffic manipulating means comprises:

a clock generator for generating a clock which is a minimum unit of measurement time, under the control of said application processing means;

a circuit for resolving power for demultiplying resolving parameters based on traffic speed information inputted by an application processor, utilizing a reference clock which is generated from the clock generator, so that proper resolving power is obtained;

an address latch for latching the lower address of memory for an arrival information between cells and the upper address of memory by utilizing a decoded value of address information, which is identified by a measurement traffic extractor by utilizing the measurement clock generated through a circuit for resolving power;

a doubled memory for having a doubled address area in the memory in such a way that the same memory area is not accessed at the same time and the same size of memory will have different offsets, for being constructed to have a toggle address bit between the upper address and lower address allocated in the memory so that no interference can occur and for receiving address inputs from a measurement traffic extracting means, a clock generator and an address latch; and a data increaser for reading out the content of a latched relevant memory, increasing this content by one and executing a writing operation.

\* \* \* \* \*